US006826299B2

(12) United States Patent
Brown et al.

(10) Patent No.: US 6,826,299 B2
(45) Date of Patent: Nov. 30, 2004

(54) PHOTOGRAMMETRIC IMAGE CORRELATION AND MEASUREMENT SYSTEM AND METHOD

(75) Inventors: John D. Brown, West Melbourne, FL (US); George Blaha, Melbourne, FL (US)

(73) Assignee: Geodetic Services, Inc., Melbourne, FL (US)

( * ) Notice: Subject to any disclaimer, the term of this patent is extended or adjusted under 35 U.S.C. 154(b) by 500 days.

(21) Appl. No.: 09/919,354

(22) Filed: Jul. 31, 2001

(65) Prior Publication Data

US 2002/0136444 A1 Sep. 26, 2002

Related U.S. Application Data

(60) Provisional application No. 60/221,711, filed on Jul. 31, 2000.

(51) Int. Cl.$^7$ .................................................. G06K 9/00
(52) U.S. Cl. ....................... 382/154; 382/218; 382/285; 345/419; 348/47; 348/744
(58) Field of Search ................................. 382/100, 103, 382/106, 153, 154, 173, 285, 275, 293, 218; 345/125, 419–427, 358, 744; 348/42, 47, 48, 744; 463/31, 32, 33; 396/325, 224, 322

(56) References Cited

U.S. PATENT DOCUMENTS

| | | | | | |
|---|---|---|---|---|---|
| 5,852,672 | A | * | 12/1998 | Lu | 382/154 |
| 6,256,099 | B1 | * | 7/2001 | Kaufman et al. | 356/603 |
| 6,683,977 | B1 | * | 1/2004 | Albrecht et al. | 382/154 |
| 6,709,116 | B1 | * | 3/2004 | Raskar et al. | 353/121 |

FOREIGN PATENT DOCUMENTS

DE         195 02 459 A1     8/1996

OTHER PUBLICATIONS

Karara, H.M., "Analytic Data–Reduction Schemes in Non–Topographic Photogrammetry," Non–Topographic Photogrammetry; $2^{nd}$ edition, American Society for Photogrammetry and Remote Sensing, pps. 43–45, Falls Church, Virginia, 1989.

Karara, H.M., "Moiré Topography: Systems and Applications," Non–Topographic Phtogrammetry; $2^{nd}$ edition, American Society for Photogrammetry and Remote Sensing, pps. 403–404, Falls Church, Virginia, 1989.

Blaha, G., "Accuracy of Plates Calibrated by an Automatic Monocomparator," Photogrammetric Engineering and Remote Sensing, 1997, vol. 63, No. 9, pps. 1129–1132.

* cited by examiner

Primary Examiner—Bhavesh M. Mehta
Assistant Examiner—Sheeb Chawan
(74) Attorney, Agent, or Firm—Allen, Dyer, Doppelt, Milbrath & Gilchrist, P.A.

(57) ABSTRACT

A first and a second, distinguishable set of images are projected onto a surface, each image having a corresponding source element with known two-dimensional coordinates relative to the projector. A pose is determined of spaced two cameras in position to image at least a portion of the surface. The three-dimensional coordinates of at least some of the first set of images are determined with the cameras, from which are calculated an initial pose of the projector. Each of the at least some of the first set of images are matched with a corresponding source element, from which matching an improved projector pose is determined. The three-dimensional coordinates of at least some of the second set of images are determined using the improved projector pose and the cameras, and the surface is characterized from the three-dimensional coordinates of the first and the second set of images.

28 Claims, 1 Drawing Sheet

PHOTOGRAMMETRIC IMAGE CORRELATION AND MEASUREMENT SYSTEM AND METHOD

CROSS-REFERENCE TO RELATED APPLICATION

This application claims priority to provisional application No. 60/221,711, filed on Jul. 31, 2000, "Photogrammetric Image Correlation and Measurement System and Method."

BACKGROUND OF THE INVENTION

1. Field of the Invention

The present invention relates to systems and methods for remote measurement of geometric features on an object, and, more particularly, to such systems and methods that are photogrammetrically based.

2. Description of Related Art

Many industrial processes and applications require an accurate description of various large, complex surfaces. Surfaces that are measured for the purpose of comparison with a desired design, quality control, or deformation evaluation include automobile parts, airplane fuselages and wings, and antenna dishes, to name but a few.

A well-established process of surface measurement that has been in use for decades includes placing a plurality of targets on a surface in a desired pattern and determining the position of the targets by photogrammetric techniques. At least two cameras of known relative position and orientation image the targets on a two-dimensional medium, such as a film or a digital-image sensor. The three-dimensional position is determined by a process of triangulation (or intersection). Known shortcomings of this technique for many applications include a need to place, and later remove, targets on the object and a practical limit on the number of targets.

Various techniques for overcoming the targeting difficulties are known in the art, wherein physical targets are replaced by dots of light cast onto a surface to be measured by a projector. These dots originate on a glass plate or another type of projectorslide, from which they are projected by a light source through a lens system onto the surface. The projected points may form a dense grid, perhaps into the thousands.

If two cameras image simultaneously with the flash of the projector, in theory they can identify and triangulate each projected point. The identification is often accomplished by a technique called epipolar matching, which seeks intersecting or nearly intersecting rays. When the number of projected points is great, the matching becomes ambiguous owing to the possibility of many rays from both cameras lying nearly in the same plane and thus offering a number of potential matches.

Resolution of most of the inherent ambiguities may be accomplished by adding a third camera to the configuration. With a proper geometrical arrangement of the cameras, the matching of a great majority of points can be accomplished quite efficiently, and the subsequent triangulation is strengthened in comparison with a two-ray triangulation. A fundamental property of such processes, whether with two or more than two cameras, is that the projector plays a passive role. It supplies the targets but does not otherwise participate in their determination.

The triangulation of targets is possible by virtue of the cameras' having a known mutual position and orientation, collectively called "pose." Each camera can acquire its pose by imaging known points in a given coordinate system, whether a system of the facility (global) or an arbitrary system established by a datum-generating device (local). Such known points are often called "reference points." If the projector should become a part of the position-determining system, its pose would likewise have to be known.

In several applications over the past decade, this approach has been addressed in the technical literature as well as in practice by rigidly mounting the cameras and the projector onto a bar or a frame. The mutual poses of the cameras and the projector are determined in a calibration procedure, which includes the calibration of the lens systems. The known positions of the dots on the projector slide then play a role similar to that of measured targets on the film or digital-image sensor, in that they can participate in the triangulation of the targets.

If the projector plays an active role, it can participate in the determination of the targets' positions together with only one camera. Again, the mutual pose is calibrated, as are the lens systems. However, if a great many points are projected, the inherent ambiguities make such an application difficult. This technique has been mentioned mainly for the sake of comparison with other methods in which a projector plays an active role, such as Moiré techniques. The latter do not treat points, but lines. A light source projects a grid of straight lines onto a surface, where they are viewed through a similar grid by a camera or another receptor. The meshing of the sets of grid lines, deformed according to the object's topography, makes it possible to map the surface. The key consideration here is that in these techniques the relative poses of the two optical systems must be known. As is explained in *Non-Topographic Photogrammetry* (ASRPS, 1989), in the section on "Survey of Instrument Types," in Appendix B, the components are rigidly coupled (aligned) to preserve the critical geometries. Examples feature integrated frameworks mounted on a base, etc.

Known systems in which a projector has an active role have been shown to have two characteristics:

1. The mutual configuration of the camera(s) and the projector must be known. Therefore, the systems are integrated into a rigid framework, and their poses are calibrated.
2. The optical properties of the lenses must be known in view of image compensation for distortion. Therefore, all optical systems are likewise calibrated.

There are several disadvantages to these properties and procedures. One of them is the complexity of rigidly integrated systems, which makes them cumbersome in industrial and/or hazardous environments, and which also makes them expensive. Such systems are not well adapted to the wide variety of measurements and measurement conditions often encountered in industry. If the situation calls for a different arrangement of the projector and the cameras than is possible with a given rigid system, the measurement cannot be performed without a rearrangement of this system on a new rigid mount, and recalibrating the entire configuration.

Another disadvantage is technical, in the sense that the systems must be recalibrated from time to time, as well as whenever even a minute physical alteration is suspected. This includes temperature changes, among others. The recalibration concerns the mutual configuration (item 1), the optical properties (item 2), or both.

Based on the preceding discussion, a need exists for a fundamental conceptual innovation, whereby a projector plays an active role in three-dimensional positional determinations, yet neither it nor the cameras are physically connected in any manner, and no extensive prior calibration of the projector or the cameras would take place. The cameras' optical systems would have their parameters reasonably well known from past calibrations, while only a few parameters of the projector's optical system would need to be known to some approximation, easily achievable without any actual measurement or testing. All the accurate calibrations would be performed simultaneously during the measurement process itself.

SUMMARY OF THE INVENTION

It is therefore an object of the present invention to provide a system and method for measuring geometric features of an object.

It is an additional object to provide such a system and method that eliminate ambiguities inherent in two-ray triangulation.

It is a further object to provide such a system and method that use a projector in three-dimensional positional determination.

It is another object to provide such a system and method that do not require an extensive calibration.

These objects and others are attained by the present invention, the method aspect of which is for characterizing at least a portion of a surface of an object. The method comprises the steps of projecting from a projector having no predetermined pose a plurality of images onto a surface desired to be characterized. The images comprise a first set of images and a second set of images distinguishable from the first set. All the first and the second set of images have known two-dimensional coordinates relative to the projector.

A pose of a first and a second camera positioned in spaced relation from each other is then determined, as are the three-dimensional coordinates of at least some of the first set of images on the surface, with the use of the first and the second cameras. From the three-dimensional coordinates the pose of the projector is determined.

Next the three-dimensional coordinates of at least some of the second set of images are determined using knowledge of the projector pose and the first and the second camera. From the three-dimensional coordinates of the first and the second set of images, then, the surface can be characterized. Thus the projector can be used as a third camera without the need to rigidly integrate and calibrate the whole system.

The system of the present invention comprises a projector, a slide having a set of opaque elements thereon to form the first and the second set of images on the surface to be characterized, at least two cameras, and an analysis routine resident in a processor.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

The FIGURE illustrates an exemplary system setup.

DETAILED DESCRIPTION OF THE PREFERRED EMBODIMENTS

Figure 1:
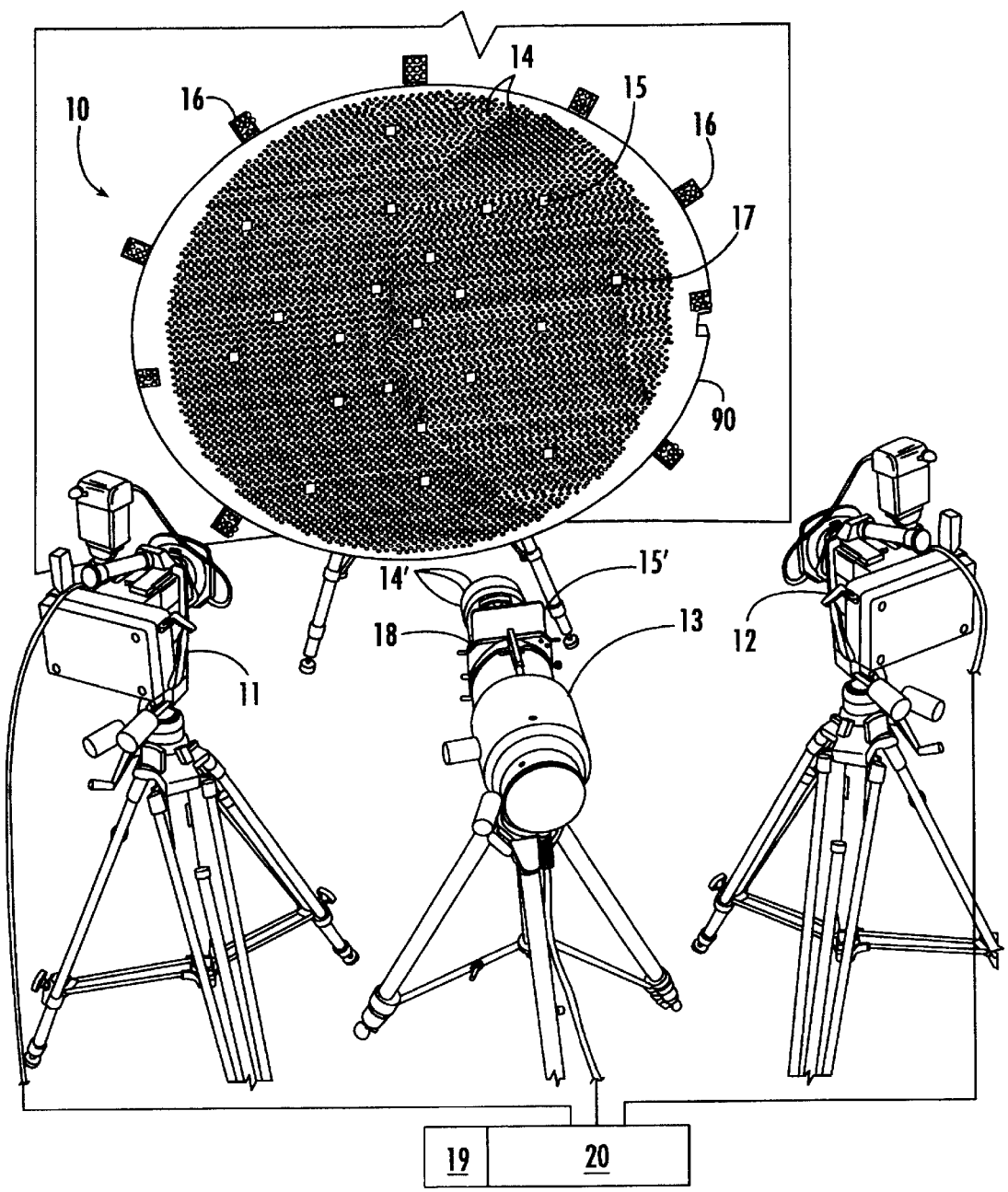

A description of the preferred embodiments of the present invention will now be presented with reference to the FIGURE.

The system 10 and method of the present invention are beneficial in performance and economy, with a preferred embodiment comprising two cameras 11,12, although this is not intended as a limitation, and additional cameras may also be used. Using a projector 13 in the role of a third camera eliminates the ambiguities inherent in two-ray triangulation of typically thousands of projected images on a surface, and strengthens the triangulation, yet only two cameras 11,12 are required. Whether the projector's 13 role is passive or active, it is necessary whenever noncontact targeting is desirable. Changing it into an active player without rigidly integrating and calibrating the whole system 10 will now be described in detail.

The method of the present invention comprises the step of first determining, with a known method such as the use of a single camera, the two-dimensional coordinates of the first 14 and the second 15 set of images relative to a projector slide 18, shown being inserted into the projector 13 in the FIGURE, with the use of a bundle adjustment of data collected by the single camera in a plurality of positions.

To characterize the surface of an object, the projector 13 shines light through a projector slide 18 containing a plurality of source elements (also referred to as dots) of the first set, also referred to as "fundamental dots" 16' and images of the second set, also referred to as "secondary dots" 14', creating an image 15,14 pattern, respectively, such as seen in the FIGURE on an object's surface 90 desired to be characterized. It will be understood by one of skill in the art that the word dot is not intended as a limitation, and that any shape of image can be characterized by the present invention; the only requirement is that the shape of the images 14,15 must be different from each other. The source dots 14',15' are positioned on the slide 18 in any desired relationship, the x,y coordinates of which are known relative to the slide 18. In the case illustrated in the FIGURE the surface 90 comprises a parabolic antenna, but it may be understood by one of skill in the art that virtually any three-dimensional object can be characterized using the method of the present invention.

The next step entails the use of the two cameras 11,12 to determine the three-dimensional coordinates of the fundamental images 15 that are projected onto a surface 90. Clearly at least two cameras 11,12 are required to perform this step, since the cameras 11,12 comprise sensors that record data in only two dimensions, and the third dimension must be obtained using a technique commonly referred to in the art as "triangulation" to determine the three-dimensional x,y,z locations of the fundamental dots hereinafter referred to as "fundamental images" 15. This step is performed immediately following the determination of the pose of the cameras 11,12 by measurement of known reference points 16 (and in the coordinate system of these points). These known reference points may be established by several means; however, the well-known method of sequential or single-camera photogrammetry is preferred, since one of the two cameras 11,12 present can be employed, although this is not intended as a limitation. Therefore, the invention 10 is suitable for stable as well as unstable environments, since the camera poses can be determined every time a set of pictures is taken by the two cameras.

The fundamental images 15 are identified by a special design distinguishing them from all the other images 14. In the present embodiment each fundamental image 15 comprises a small dot (similar to a secondary dot) 14 surrounded with a ring 17. They thus play the role of "coded" targets that the cameras 11,12 can reliably identify. This identification represents another innovation, since the fundamental images 15 need not be different from one another in their design; they only need to be distinguishable from all the (typically thousands of) secondary images 14. Being relatively few, the fundamental images 15 can be reliably identified and triangulated by the two cameras 11,12 by virtue of minimal or no ambiguities.

Once the three-dimensional coordinates of the fundamental images 15 are reasonably well determined in situ by the two cameras 11,12, they serve as reference points for the projector 13 in the role of a third camera. As mentioned, their two-dimensional x,y coordinates are accurately known from the one-time calibration of the projector slide 18; however, the determined fundamental images 15, having no distinguishable features among themselves, have not been matched to the corresponding fundamental dots 15' on the projector slide 18 at this stage. Such matching, representing another step in the method of the invention, is performed by repeated pose determinations for the projector 13, which process uses combinations of three fundamental images 15 at a time and testing each combination against the known two-dimensional location of all the fundamental dots 15'. The "winning combination" comprises the first situation in which all the remaining fundamental images 15, when back-projected onto the projector slide 18, coincide with the respective fundamental dots 15' on the slide. This situation then determines the proper labeling of the three-dimensional coordinates of the points (fundamental images 15 at this stage; all the other secondary images 14 at a later stage), which is another innovation of the present invention.

With all the three-dimensional fundamental images 15 seen by the two cameras 11,12 being properly identified, and with the initial, approximate pose of the projector 13 being known from the outcome of the "winning combination," this step is concluded upon determining an improved pose of the projector 13 in a least-squares adjustment using all the fundamental images 15 seen by the two cameras 11,12. This adjustment simultaneously improves the initial nominal parameters of the projector lens system. The projector 13 then effectively becomes a third camera.

As will be understood by one of skill in the art, the mathematical analysis performed in the invention are performed using software 19 resident in a processor 20 that it is in electronic communication with the two cameras 11,12 and with the projector 13. Such software 19 is adapted to perform the least-squares adjustments and geometric analysis such as bundle adjustment. Bundle adjustment is a photogrammetric algorithm well-known in the art and is described in numerous references, including *Non-Topograhic Photogrammetry*, 2$^{nd}$ edition, 1989, Karara et al. (Section 4–3.3, pp. 43–45), the disclosure of which is incorporated herein by reference. Output may be provided in the form of three-dimensional coordinates for each image point or as deviations of the three-dimensional image points from the design surface. This output form is exemplary and is not intended as a limitation on the present invention.

Various embodiments are contemplated for subsequent steps of the method of the present invention. A next step improves the projector's parameters (pose, lens system) further, by adding a number (tens to hundreds) of unambiguous images 14 to the database of determined images 15. Such images 14 are again reliable, this time by virtue of three-camera matching.

Next a rigorous bundle adjustment is performed, which comprises a simultaneous least-squares adjustment that further improves not only the projector's pose and lens-system parameters, but also the lens-system parameters of the two cameras 11,12 and mutual poses of these cameras 11,12.

Another step may comprise a repetition of the target-adding step, except that many images are determined for the subsequent bundle adjustment. The possibility of determining the location of many images at this stage stems from improved projected parameters, the fact that has made the projector 13 into a good- to high-quality camera. Finally, all the remaining three-dimensional coordinates of the images 15 seen by all three cameras 11–13 can be resolved by three-ray triangulation. There is no need for another bundle adjustment because the quality of the projector 13 (and the two cameras 11,12) is already at or near its potential, and because the bundle adjustment with thousands of images would be uneconomical.

There may exist three-dimensional coordinates of images 15 that were not resolved by the three-camera matching. Such points would have been measured either by only the first camera 11, or by only the second camera 12. But since they are "measured" by the projector 13 by definition, they can now be resolved by two-camera matching. This procedure, where the projector is instrumental in identifying and triangulating heretofore untreatable points, is believed to represent yet another innovation. After the termination of a task of surface determination, some of the latest parametric values for the projector's optical system can serve as initial values for the next task.

Photogrammetric Calibration of the Projector Slide

The step wherein the projector's 13 passive role is changed into an active role implies that the two-dimensional x,y coordinates of the fundamental dots 15' on the projector slide 18 are accurately known. The subsequent step(s) imply that all the other dots 15' on the projector slide 18 are accurately known as well. Next is described a photogrammetric procedure for calibrating all dots 14',15' on the projector slide 18 so that their two-dimensional x,y coordinates indeed are accurate. This represents yet another aspect of the present invention.

Initially, nominal two-dimensional coordinates of all dots 14',15' on the projector slide 18 are known from the manufacturing design. These x,y coordinates, in general, are approximate, and are thus typically not suitable for the actual matching procedure using the projector 13 as the third camera. However, their quality is sufficient for setting up and adjusting a calibration model.

In principle, all dots 14',15' are projected onto a suitable surface to become images 14,15, which are measured as projected onto the desired surface 90 from three or more camera stations, whether simultaneously or sequentially. In the latter, preferred case, only one camera performs the measurements under the standard assumption that the projector 13 is stable when undergoing calibration. The surface is deemed "suitable" if all projected images 14,15 are measurable, and if its geometry provides for a strong resection adjustment.

The three-dimensional x,y,z coordinates of the fundamental images 15 (i.e., projected fundamental dots 15') are determined by multiple-camera matching. Similar to one of the steps of the invention, the repeated pose determinations of the projector 13 lead to the above-described "winning combination," which results in a final approximate pose. Owing to the approximate nature of the fundamental dots' 15' two-dimensional x,y coordinates, the approximation is not of a relatively high quality characterizing this step of the invention. Nor do the back-projected fundamental images 15 coincide as closely with the fundamental dots on the slide. However, the projector's 13 pose is sufficiently accurate for back-projecting all the other determined images 15 from the surface 90 to the slide 18 and identifying them with appropriate dots. The coincidence is again imperfect, but has a smaller error than identifying an incorrect dot located a full grid interval away.

Subsequently, the projector 13 is subjected to a resection-type least-squares adjustment, where all determined images 15 are fixed (three-dimensional control points), and where the interior- and exterior-orientation parameters are unknown and adjustable. However, these parameters are of no interest in themselves, serving mainly in furnishing adjusted two-dimensional x,y coordinates of all dots 14',15'. The "measured" coordinates of these dots 14',15' entering the adjustment are the nominal (manufacturing-design) coordinates mentioned previously. Since the corrections to such "measured" values are likely to be relatively large, the whole resection adjustment may be repeated once or twice, where the new "measured" coordinates are the previous adjusted coordinates of all dots 14',15'. The last set of adjusted coordinates represents the two-dimensional calibrated x,y coordinates of all dots 14',15' that can be used for a number of projects, until there is an indication that a new calibration is in order for mechanical, environmental, or other reasons.

Versatility Aspects

As indicated in the method steps above, the invention is applicable in stable as well as unstable environments. In an unstable environment, the two cameras 11,12 measure simultaneously (M mode of measurement) with the projector flash. Thus any preceding or subsequent motion of the projector 13 and/or either camera 11,12 is inconsequential. In a stable environment, any projector flash exactly reproduces all projected images 14,15 from any other flash. Therefore, a single camera may be used (S mode of measurement), moving from one station to the next. In addition to being capable of operating in unstable environments, characteristic of many factory-floor applications, the M mode has the advantage of producing results in a near-real-time fashion.

Another step in the invention has been identified as enlarging the set of fundamental images 15 by a subset of the secondary images 14 and performing a bundle adjustment that further improves the projector's parameters and, possibly, also the camera parameters. A further enlargement of all such points has also been mentioned. Such enlargements are optional, attesting to the flexibility of the entire procedure. In many cases they may be omitted, and the projector's parameters may be adopted directly from the step associated only with the fundamental points. In this option, all the three-dimensional x,y,z coordinates of images 14,15 are resolved by three-way triangulation following this step.

The two-dimensional calibration of the projector slide 18 also underscores the versatility of the present invention, which comprises at least two distinct and fundamentally different embodiments. The first type of two-dimensional calibration is direct, performed by various types of (automatic) monocomparators. One such device is described in "Accuracy of Plates Calibrated by an Automatic Monocomparator" [*PERS* 63(9), 1129–32, 1977], the disclosure of which is incorporated by reference herein.

The second embodiment for calibrating the two-dimensional dot 14',15' coordinates is indirect, described above as photogrammetric calibration of the projector slide 18. This calibration includes further versatility, in that it can be performed in stable as well as unstable environments. Although the former kind of calibration is preferred in practice (in S mode), the latter (in M mode) can be useful if the projector is suspected of undergoing small motion from one flash to the next. Such motion could be the result of unstable or improper mounting of the projector 13, possibly combined with the physical effect of flashing.

It may be appreciated by one of skill in the art that one of the many advantages of the present invention is the lack of a cumbersome, fixed arrangement of cameras and projector as in prior art systems. Rather, this invention can be practiced in situ, with the rigidity of the connection between the elements being performed mathematically instead of physically.

It may be appreciated by one skilled in the art that additional embodiments may be contemplated, including alternate shapes and configurations of the feature target and camera positions.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for characterizing a surface of an object comprising the steps of:

projecting from a projector a plurality of images onto a surface desired to be characterized, the images comprising a first set of images and a second set of images distinguishable from the first set, each of the first and the second set of images having a corresponding source element having known two-dimensional coordinates relative to the projector;

determining a pose of a first and a second camera positioned in spaced relation from each other and in position to image at least a portion of the desired surface;

determining three-dimensional coordinates of at least some of the first set of images on the surface using the first and the second cameras;

calculating from the determined three-dimensional coordinates an initial pose of the projector;

matching each of the at least some of the first set of images with a corresponding source element;

determining from the matching step an improved pose of the projector;

determining three-dimensional coordinates of at least some of the second set of images using the improved projector pose and the first and the second camera; and characterizing the surface from the three-dimensional coordinates of the first and the second set of images.

2. The method recited in claim 1, wherein the projecting step comprises:

providing a slide having a predetermined pattern of translucent source elements and a substantially opaque background surrounding the translucent elements;

inserting the slide into the projector; and shining light through the slide, the translucent elements forming the first and the second set of images on the surface.

3. The method recited in claim 1, wherein the first set of images comprises a significantly smaller number than the second set of images.

4. The method recited in claim 3, wherein each of the first set of images is larger than each of the second set of images.

5. The method recited in claim 4, wherein the second set of images comprises a set of dots and the first set of images comprises a set of dots surrounded by a circle.

6. The method recited in claim 1, wherein the first and the second camera pose determining step comprises the steps of:
   for each camera, measuring two-dimensional coordinates of a plurality of reference points having known three-dimensional coordinates; and
   determining the pose of the camera from the measured two-dimensional coordinates.

7. The method recited in claim 1, wherein the three-dimensional coordinate determination of the at least some of the first set of images comprises the steps of:
   for each camera, sensing two-dimensional coordinates of at least some of the first set of images; and
   analyzing the sensed coordinates to determine three-dimensional coordinates of the at least some of the first set of images.

8. The method recited in claim 7, wherein the analyzing step comprises performing a triangulation.

9. The method recited in claim 1, wherein the initial projector pose determining step comprises taking a plurality of combinations of sets of three of the first set of images, each combination tested against the known two-dimensional coordinates relative to the projector of at least some of the first set of images, a preferred combination comprising a best fit therebetween.

10. The method recited in claim 9, wherein the plurality of combinations comprises all possible combinations of all sets of three of the first set of images.

11. The method recited in claim 1, wherein the three-dimensional coordinates of at least some of the second set of images determining step comprises the steps of:
    measuring the two-dimensional coordinates of the at least some of the second set of images with the first and the second camera to create a first and a second camera data set of the second set of images; and
    analyzing the first and the second camera data set of the second set of images and the projector pose to determine the three-dimensional coordinates of the at least some of the second set of images.

12. The method recited in claim 11, wherein the analyzing step comprises performing a triangulation.

13. The method recited in claim 1, wherein the surface characterizing step comprises at least one of calculating a mathematical representation of the surface and calculating a deviation from a mathematical representation of the surface, based upon the determined three-dimensional coordinates of the first and the second set of images.

14. A system for characterizing a surface of an object comprising:
    a projector positionable in a pose;
    means for projecting from the projector a plurality of images onto a surface desired to be characterized, the images comprising a first set of images and a second set of images distinguishable from the first set, each of the first and the second set of images having a corresponding source element having known two-dimensional coordinates relative to the projector;
    a first and a second camera positioned in spaced relation from each other and in position to image at least a portion of the object surface;
    means for determining a pose of the first and the second camera using at least some of the first set of images;
    means for determining three-dimensional coordinates of at least some of the first set of images on the surface using the first and the second cameras;
    means for calculating from the three-dimensional coordinates an initial pose of the projector;
    means for matching each of the at least some of the first set of images with a corresponding source element;
    means for determining from the matching an improved pose of the projector;
    means for determining three-dimensional coordinates of at least some of the second set of images using the improved projector pose and the first and the second camera; and
    means for characterizing the surface from the three-dimensional coordinates of the first and the second set of images.

15. The system recited in claim 14, wherein the projecting means comprises:
    a slide having a predetermined pattern of translucent source elements and a substantially opaque background surrounding the translucent elements; and means for positioning the slide in the projector in an illumination pathway of the projector.

16. The system recited in claim 14, wherein the first set of images comprises a significantly smaller number than the second set of images.

17. The system recited in claim 16, wherein each of the first set of images comprises a larger image than each of the second set of images.

18. The system recited in claim 17, wherein the second set of images comprises a set of dots and the first set of images comprises a set of dots surrounded by a circle.

19. The system recited in claim 14, wherein the first and the second camera pose determining means comprises:
    a plurality of reference points having known three-dimensional coordinates positioned adjacent the surface in a location capable of being sensed by the first and the second camera;
    means for measuring two-dimensional coordinates of at least some of the sensed reference points using each camera; and
    means for determining the pose of the first and the second camera from the measured three-dimensional coordinates of the reference points.

20. The system recited in claim 14, wherein the three-dimensional coordinate determining means of at least some of the first set of images comprises:
    using each camera to sense two-dimensional coordinates of at least some of the first set of images; and
    means for analyzing the sensed coordinates to determine three-dimensional coordinates of the at least some of the first set of images.

21. The system recited in claim 20, wherein the analyzing means comprises means for performing a triangulation.

22. The system recited in claim 14, wherein the initial projector pose determining means comprises the first and the second camera, comprising means for taking a plurality of combinations of sets of three of the first set of images, each combination testable against the known two-dimensional coordinates relative to the projector of at least some of the first set of images, a preferred combination comprising a best fit therebetween.

23. The system recited in claim 22, wherein the plurality of combinations comprises all possible combinations of all sets of three of the first set of images.

24. The system recited in claim 14, wherein the three-dimensional coordinates of at least some of the second set of images determining means comprises:

the first and the second camera, comprising means for sensing the at least some of the second set of images;

means for creating a first and a second camera data set of the second set of images; and means for analyzing the first and the second data set of the second set of images to determine the three-dimensional coordinates of the at least some of the second set of images.

25. The system recited in claim 24, wherein the analyzing means comprises means for performing a triangulation.

26. The system recited in claim 14, wherein the surface characterizing means comprises means for calculating at least one of a mathematical representation of the surface and for calculating a deviation from a mathematical representation of the surface, based upon the determined three-dimensional coordinates of the first and the second set of images.

27. The system recited in claim 14, wherein the determining and the characterizing means comprise:

a processor in electronic communication with the projector and with the first and the second camera; and analytical software resident in the processor for performing geometric calculations based upon data provided by the first and the second camera.

28. The system recited in claim 27, wherein the analytical software comprises means for performing a bundle adjustment and a triangulation.

* * * * *